United States Patent [19]  
Riley et al.

[11] 4,090,490  
[45] May 23, 1978

[54] EASY CLEAN BARBEQUE GRILL

[75] Inventors: James R. Riley, 3816½ W. 118th Pl., Hawthorne, Calif. 90250; Sarah M. Riley, Hawthorne, Calif.

[73] Assignee: James Ross Riley, Hawthorne, Calif.

[21] Appl. No.: 766,710

[22] Filed: Feb. 8, 1977

[51] Int. Cl.² .......................... A47J 37/07; F24B 3/00
[52] U.S. Cl. .................... 126/25 R; 110/167; 126/245; 222/609; 248/129; 298/1; 298/10
[58] Field of Search ............... 126/9 R, 9 B, 25 R, 126/25 A, 25 B, 25 C, 242, 245, 149; 110/167; 99/339, 340; 298/1, 2, 10; 214/312, 363, 318, 301, 302; D7/107, 108, 109, 110; 220/4 B, 4 E; 312/248, 284; 248/134, 130, 138, 129

[56] References Cited

U.S. PATENT DOCUMENTS

| 8,092 | 2/1878 | Bennett | 298/10 X |
|---|---|---|---|
| 750,547 | 1/1904 | Keller | 312/248 |
| 805,047 | 11/1905 | Watson | 248/134 |
| 947,785 | 2/1910 | Bjork et al. | 126/242 X |
| 1,485,496 | 3/1924 | Elliott | 248/134 X |
| 2,121,514 | 6/1938 | Waterman | 248/134 X |
| 2,303,067 | 11/1942 | Richard | 248/134 |
| 2,523,641 | 9/1950 | Alvarez | 99/339 X |
| 2,573,988 | 11/1951 | Saltzberg | 126/25 A |
| 2,666,426 | 1/1954 | Pollard | 126/9 B |
| 3,318,300 | 1/1967 | Witty | 126/245 X |

FOREIGN PATENT DOCUMENTS

| 1,346,971 | 11/1963 | France | 298/2 |
|---|---|---|---|
| 870,058 | 6/1961 | United Kingdom | 220/4 B |

Primary Examiner—William F. O'Dea  
Assistant Examiner—Harold Joyce

[57] ABSTRACT

A portable barbeque grill having a coal-receiving member hingedly connected to a cover member rotatably mounted between a pair of inverted U-shaped side frame members. The hinge means between the cover member and the coal-receiving member mounts the coal-receiving member and cover member off center between the juncture of the rear legs and the bight portion of the inverted U-shaped frame members so that the coal-receiving member can rotate under its own weight to a position wherein coals and ashes can be readily removed from its interior. The coal-receiving member can be locked in a substantially horizontal position by retaining pins received through the juncture of the front legs and bight portions of the inverted U-shaped frame members and inserted into the coal-receiving member to preclude it from rotating. Means are also provided to maintain the cover member in an open position relative to the coal-receiving member to that it will not interfere with the cleaning of the coal-receiving member but the cover member can be closed on the coal-receiving member during cooking.

8 Claims, 4 Drawing Figures

EASY CLEAN BARBEQUE GRILL

PRIOR ART

The following patents are representative of the state of the art:
U.S. Pat. No. 2,909,170
U.S. Pat. No. 2,933,080
U.S. Pat. No. 3,126,881
U.S. Pat. No. 3,174,473
U.S. Pat. No. 3,200,806
U.S. Pat. No. 3,209,743
U.S. Pat. No. 3,330,266
U.S. Pat. No. 3,430,621

BACKGROUND OF THE INVENTION

This invention relates to a barbeque grill, and more particularly, a barbeque grill construction designed to facilitate the cleaning of the interior of the grill after cooking.

Presently, portable barbeque grills must be turned upside down to remove ashes and burnt coals used for cooking on the grill. Alternatively, the ashes are scooped from the grill with a cleaning implement and disposed of. In either case, this is a laborious and tecious task, often resulting in the ashes or partially burnt coals remaining in the grill and accumulating therein. The present invention provides a portable barbeque grill structure which is designed to facilitate the cleaning of the grill.

SUMMARY OF THE INVENTION

In accordance with the invention, the barbeque grill includes a pair of semi-cylindrical portions pivotably connected along mating edges. On of the semi-cylindrical portions mounts a grill and receives a plurality of charcoal coals for cooking on the grill. The other semi-cylindrical portion provides a cover for the grill. Means pivotably mounting the cover to the grill and coal-receiving portion also pivotably mounts the portions between a pair of inverted U-shaped frame members at the juncture of the bight of each frame member with the rear leg thereof. The coal-receiving portion pivots under its own weight about the mounting to a position in which the coals and ashes can be conveniently dumped from the coal-receiving portion onto a rack. In its cooking use position, a pair of locking pins are used to secure the coal-receiving portion of the barbeque to the juncture of the front legs and bight portion of each inverted U-shaped frame member to preclude it from rotating to the dump position.

BRIEF DESCRIPTION OF THE DRAWING

Further objects and advantages of the invention will become apparent from the following description and Claims, and from the accompanying drawing, wherein:

DETAILED DESCRIPTION OF THE PREFERRED EMBODIMENT

Figure 1:
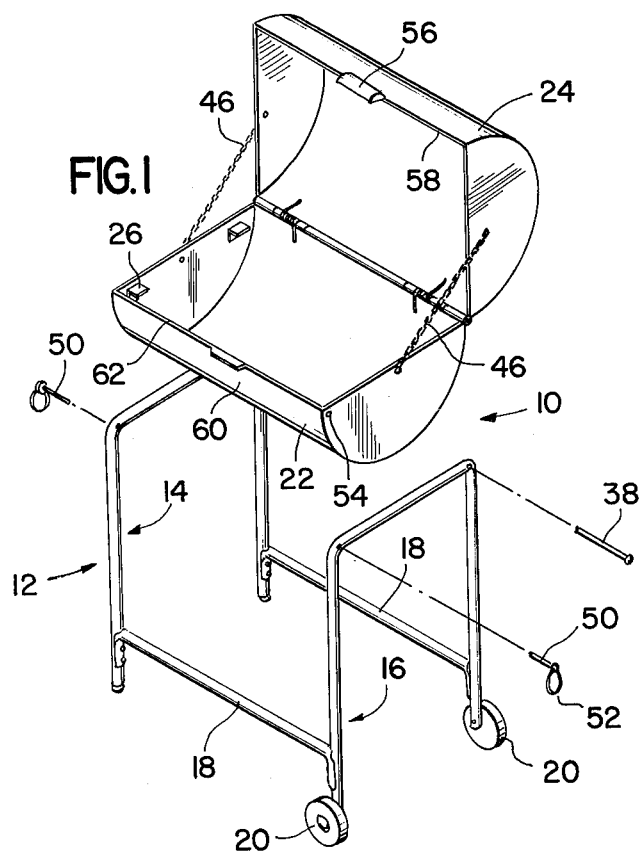
FIG. 1 is an exploded perspective view of the barbeque grill of the present invention in its normal use position.

Referring now to the drawing in detail, wherein like numerals indicate like elements throughout the several views, the barbeque grill 10 of the present invention includes a frame 12 having a pair of inverted U-shaped frame members 14 and 16 connected by horizontal braces 18 extending between the legs of each frame member 14 and 16. The legs of one of the frame members, such as frame 16, may be provided with a pair of wheels 20 for rolling the frame and barbeque grill 10 along a patio surface.

Mounted between the bight portions each of the frame members 14 and 16 are a pair of semi-cylindrical members 22 and 24. Member 22 provides a cooking chamber and a housing for a plurality of charcoal coals in a well known conventional manner. Briefly, a grill is supported on top of a pair of brackets such as brackets 26 connected to the side walls of member 22. Semi-cylindrical member 24 is hingedly connected to the rear edge of member 22 and forms a cover for the cooking member 22.

The rear edge 26 of member 22 has spaced cylindrical portions 28 and 30 fixed thereto which are adapted to be aligned with spaced cylindrical portions 32 and 34 on rear edge 36 of cover 24 to receive therethrough a rod 38 establishing a pivot connection between cover 24 and coal-receiving and cooking housing 22.

A coil spring 40 is mounted on rod 38 between cylindrical portion 32 and 34 and has one end 42 in contact with the interior surface of cover 24 and an opposite end 44 in contact with the exterior suface of member 22. Coil spring 44 thus biases the cover 24 to an open position relative to member 22. It should be understood that a similar hinge construction is provided at the opposite end of mating edges 26 and 36 of each member 22 and 24. For additional support, chains 46 extend between the side walls of members 22 and 24, and preclude rotation of the cover 24 relative to member 22 past a substantially perpendicular position as shown in FIG. 1.

Figure 2:
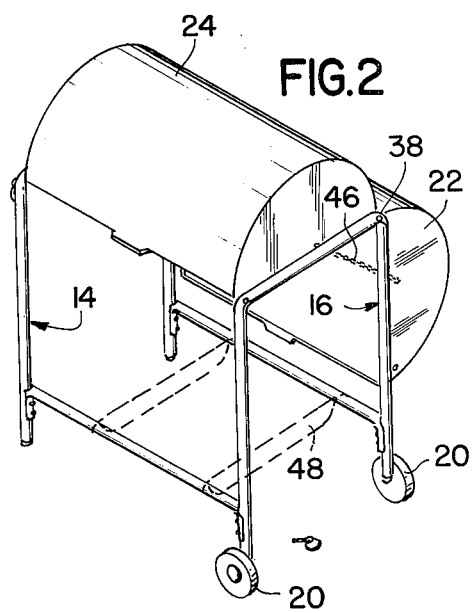
FIG. 2 is a perspective view of the barbeque grill of FIG. 1 in its cleaning position.
Figure 3:
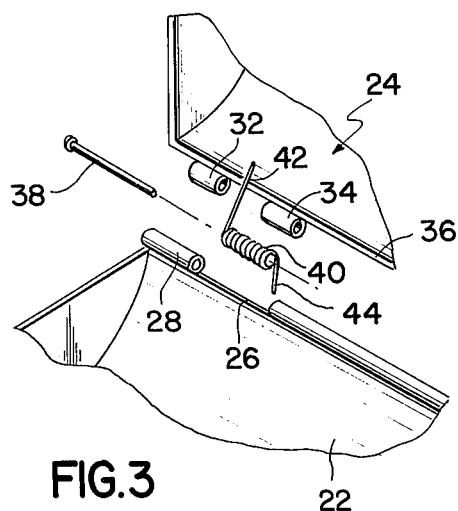
FIG. 3 is an enlarged detailed view of the circled portion indicated by circle 3 of FIG. 1.

The pivot pins or rods 38 also mount members 22 and 24 between the frame members 14 and 16 by being inserted in a hole formed at the juncture of the bight and rear leg of each frame member 14 and 16. As shown in FIG. 2 and in phantom lines in FIG. 4, normally the coal housing member 22 will rotate about pins 38 so that it is positioned substantially parallel to the rear legs of each frame member 14 and 16 with the cover 24 assuming a position parallel to the bight portions of each frame member 14 and 16. This is due to the off-center mounting provided by rods 38. In this position, spent coals and ashes may be cleaned from the interior of member 22, after removal of the grill from its support brackets 26 and accumulated in a rack or basket 48 hooked over the horizontal braces 18 extending between each frame member 14 and 16. Springs 40 retain the open relationship of members 22 and 24 so that the interior of member 22 can be readily cleaned.

Figure 4:
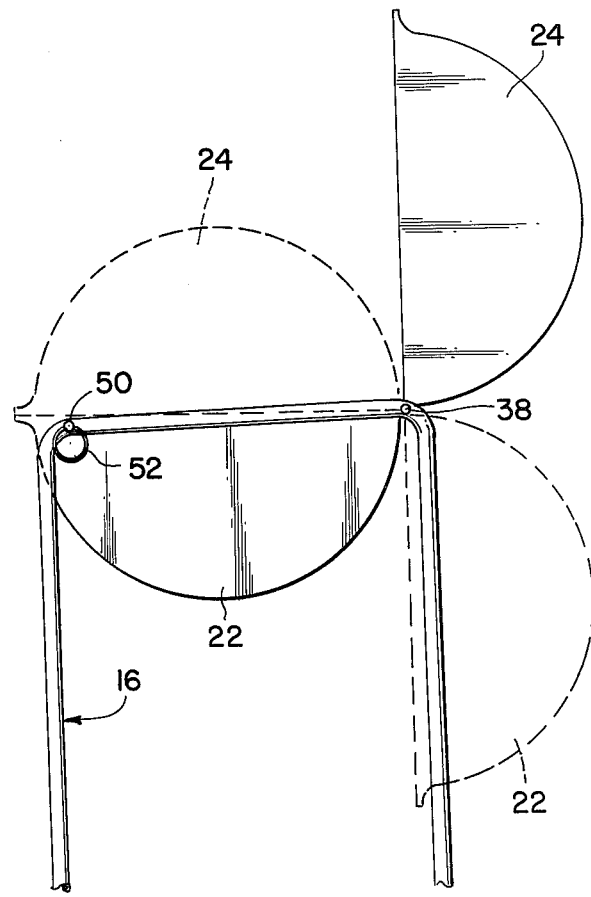
FIG. 4 is a side view in elevation of the barbeque grill of FIG. 1, illustrating the conventional use position of the grill in full lines and the cleaning position of the grill in phantom lines.

In order to use the barbeque grill 10 for cooking, members 22 and 24 are rotated to the full line position as illustrated in FIG. 4 about rods 38 and a locking pin 50, each having a ring pull 52 at one end thereof, is inserted through the juncture of the front leg and bight portion of each frame member 14 and 16 into an aligned opening 54 in the opposite side walls of member 22 to preclude member 22 from rotating about rods 38 under its own weight. The grill within member 22 will then be substantially horizontal and occupy the plane defined by the bight portions of the frame members 14 and 16.

Cover 24 can be provided with a handle 56 depending from its front edge 58 for snapping over a keeper plate 60 of the front edge of member 22 to hold the cover on member 22 against the bias of springs 40.

While a specific embodiment of an easy clean barbeque grill has been disclosed in the foregoing description, it will be understood that various modifications within the spirit of the invention may occur to those skilled in the art. Therefore, it is intended that no limitations be placed on the invention except as defined by the scope of the appended claims.

We claim:

1. A barbeque grill comprising:
   a pair of spaced frame members,
   a coal-receiving cooking member having a front and rear edge,
   a cover member having a front and rear edge,
   means pivotably connecting the rear edge of said cover member to the rear edge of said coal-receiving member said pivotably mounting the rear edges of said members between said first and second frame members,
   whereby said coal-receiving member may be pivot under its own weight from a substantially horizonal plane to a substantially vertical plane at which position it may be cleaned, and
   means between each of said frame members and sad coal-receiving member for locking said coal-receiving member to said frame members with its front and rear edges in a substantially horizontal plane,
   whereby food may be cooked on a grill adapted to be supported in a horizontal position in said coal-receiving member.

2. The grill of claim 1 wherein said pivot means includes
   means for urging said cover member to an open position relative to said coal-receiving member.

3. The grill of claim 1 wherein said locking means includes
   a locking pin inserted through each of said frame members into a side wall of said coal-receiving member.

4. The grill of claim 3 where each of said locking pins includes a ring pull on one end thereof.

5. The grill of claim 2 wherein
   the front edge of said cover member includes a handle shaped for snap engagement over a keeper plate extending from the front edge of said coal-receiving member,
   whereby said cover member may be closed on said coal-receiving member against the bias of said urging means.

6. The grill of claim 1 wherein said coal-receiving member and said cover member are substantially semi-cylindrical in shape.

7. The grill of claim 1 wherein
   said first and second frame members are substantially inverted U-shaped frames, and
   said pivot means including a rod insertable through the juncture of the rear legs of each of said first and second inverted U-shaped frame members and the bight portion of each of said first and second inverted U-shaped frame members into alignable cylindrical members on the back edges of both said cover element and said coal-receiving element.

8. The grill of claim 2 including
   chain means extending between the coal-receiving member and said cover member for preventing the opening of said cover member under the bias of said urging means past a predetermined position.

* * * * *